United States Patent
Xiahou et al.

(10) Patent No.: US 11,848,762 B2
(45) Date of Patent: Dec. 19, 2023

(54) LIVE BROADCAST STREAM PUSHING METHOD AND APPARATUS, AND ELECTRONIC DEVICE

(71) Applicant: BEIJING BYTEDANCE NETWORK TECHNOLOGY CO., LTD., Beijing (CN)

(72) Inventors: Jiaxi Xiahou, Beijing (CN); Yu Zhang, Beijing (CN); Mao Li, Beijing (CN); Jiaqi Chen, Beijing (CN); Weiwei Ye, Beijing (CN); Haidong Li, Beijing (CN); Xin Zhang, Beijing (CN); Haoran Pang, Beijing (CN); Ziyun Qi, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 17/945,014

(22) Filed: Sep. 14, 2022

(65) Prior Publication Data

US 2023/0007318 A1    Jan. 5, 2023

Related U.S. Application Data

(63) Continuation of application No. PCT/CN2021/083155, filed on Mar. 26, 2021.

(30) Foreign Application Priority Data

Mar. 27, 2020    (CN) .......................... 202010232252.2

(51) Int. Cl.
*H04L 12/18* (2006.01)
*H04L 65/403* (2022.01)
*H04N 7/15* (2006.01)

(52) U.S. Cl.
CPC ........ *H04L 65/403* (2013.01); *H04L 12/1822* (2013.01); *H04N 7/155* (2013.01)

(58) Field of Classification Search
CPC .... H04L 65/403; H04L 12/1822; H04N 7/155
(Continued)

(56) References Cited

U.S. PATENT DOCUMENTS

| 9,344,681 B2 | 2/2016 | Block et al. |
| 2006/0179115 A1 | 8/2006 | Garcia-Martin et al. |

(Continued)

FOREIGN PATENT DOCUMENTS

| CN | 101626483 A | 1/2010 |
| CN | 102111387 A | 6/2011 |

(Continued)

OTHER PUBLICATIONS

International Patent Application No. PCT/CN2021/083155; Search Report; dated Jun. 17, 2021; 3 pages.

(Continued)

*Primary Examiner* — Glenford J Madamba
(74) *Attorney, Agent, or Firm* — BakerHostetler (57) ABSTRACT

Disclosed are a live broadcast stream pushing method and apparatus, and an electronic device. One specific embodiment of the method comprises: receiving viewing permission setting information, wherein the viewing permission setting information is used for representing viewing permission of viewing a live broadcast stream of a multimedia conference; on the basis of the live broadcast starting state of the multimedia conference and the viewing permission setting information, determining whether to push the live broadcast stream of the multimedia conference to a requester who requests the live broadcast stream; and in response to determining to push the live broadcast stream of the multimedia conference to the requester, pushing the live broad- (Continued)

cast stream of the multimedia conference to the requester. According to the embodiment, the flexibility of pushing a live broadcast stream of a multimedia conference is improved.

20 Claims, 3 Drawing Sheets

(58) Field of Classification Search
    USPC .......................................................... 709/204
    See application file for complete search history.

(56) References Cited

U.S. PATENT DOCUMENTS

| | | | |
|---|---|---|---|
| 2008/0244040 | A1 | 10/2008 | Bhatia et al. |
| 2015/0002618 | A1* | 1/2015 | Meek .................... H04L 65/403 |
| | | | 348/14.09 |
| 2016/0057391 | A1 | 2/2016 | Block et al. |
| 2016/0119262 | A1 | 4/2016 | Siegel et al. |
| 2017/0064399 | A1 | 3/2017 | Jabara et al. |

FOREIGN PATENT DOCUMENTS

| | | | |
|---|---|---|---|
| CN | 101626483 B | | 7/2011 |
| CN | 104754284 A | | 7/2015 |
| CN | 104811773 A | | 7/2015 |
| CN | 105656876 A | | 6/2016 |
| CN | 104754284 B | * | 8/2018 |
| CN | 109275036 A | | 1/2019 |
| CN | 109729369 A | | 5/2019 |
| CN | 109977297 A | | 7/2019 |
| CN | 110099242 A | | 8/2019 |
| JP | 2004-015183 A | | 1/2004 |
| JP | 2009-020829 A | | 1/2009 |
| JP | 2010-523046 A | | 7/2010 |
| JP | 2018-157493 A | | 10/2018 |
| WO | WO 2013/051952 A | | 4/2013 |
| WO | WO 2016/045560 A1 | | 3/2016 |
| WO | WO 2019/223687 A1 | | 11/2019 |

OTHER PUBLICATIONS

European Patent Application No. 21774486.1; Extended Search Report; dated Mar. 31, 2023; 14 pages.

* cited by examiner

LIVE BROADCAST STREAM PUSHING METHOD AND APPARATUS, AND ELECTRONIC DEVICE

REFERENCE TO RELATED APPLICATION

This application is a continuous application of International Patent Application No. PCT/CN2021/083155, titled "LIVE BROADCAST STREAM PUSHING METHOD AND APPARATUS, AND ELECTRONIC DEVICE", filed on Mar. 26, 2021, which claims priority to Chinese Patent Application No. 202010232252.2, titled "LIVE BROADCAST STREAM PUSHING METHOD AND APPARATUS, AND ELECTRONIC DEVICE", filed on Mar. 27, 2020, both of which are incorporated herein by reference in their entireties.

FIELD

Embodiments of the present disclosure relate to the field of Internet technologies, and in particular, to a live stream pushing method, a live stream pushing apparatus, and an electronic device.

BACKGROUND

With the development of Internet technology, some multimedia conference applications are developed. It is understandable that a multimedia conference application is an application program used for holding a multimedia conference by multiple users in a remote manner.

In some scenarios, when a multimedia conference is held, the live stream of the multimedia conference may be pushed to a user, so that the user can learn the conference content of the multimedia conference by viewing the live stream of the multimedia conference.

SUMMARY

This summary is provided to introduce concepts in a simplified form, which are described in detail in the following descriptions. This summary is neither intended to identify key features or essential features of the claimed technical solution, nor intended to be used to limit the scope of the claimed technical solution.

Embodiments of the present disclosure provide a live stream pushing method, a live stream pushing apparatus, and an electronic device, which improve the flexibility of pushing a live stream of a multimedia conference.

In a first aspect, an embodiment of the present disclosure provides a live stream pushing method, which includes: receiving viewing permission setting information, wherein the viewing permission setting information represents a viewing permission for viewing a live stream of a multimedia conference; determining whether to push the live stream of the multimedia conference to a requester requesting the live stream, based on an enabling status of live broadcast of the multimedia conference and the viewing permission setting information; and pushing the live stream of the multimedia conference to the requester, in response to determining to push the live stream of the multimedia conference to the requester.

In a second aspect, an embodiment of the present disclosure provides a live stream pushing apparatus, which includes: a receiving unit, configured to receive viewing permission setting information, wherein the viewing permission setting information represents a viewing permission for viewing a live stream of a multimedia conference; a determining unit, configured to determine whether to push the live stream of the multimedia conference to a requester requesting the live stream, based on an enabling status of live broadcast of the multimedia conference and the viewing permission setting information; and a pushing unit, configured to push the live stream of the multimedia conference to the requester, in response to determining to push the live stream of the multimedia conference to the requester.

In a third aspect, an embodiment of the present disclosure provides an electronic device, comprising: one or more processors; and a storage device for storing one or more programs. The one or more programs, when executed by the one or more processors, cause the one or more processors to perform the live stream pushing method according to the first aspect.

In a fourth aspect, an embodiment of the present disclosure provides a computer-readable medium storing a computer program. The program, when being executed by a processor, causes the processor to perform the live stream pushing method according to the first aspect.

In the live stream pushing method, the live stream pushing apparatus and the electronic device provided by the embodiments of the present disclosure, first viewing permission setting information is received. Then, whether to push the live stream of the multimedia conference to a requester requesting the live stream is determined based on an enabling status of live broadcast of the multimedia conference and the viewing permission setting information. Finally, in response to determining to push the live stream of the multimedia conference to the requester, the live stream of the multimedia conference is pushed to the requester. In this way, the flexibility of pushing the live stream of the multimedia conference is improved.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DETAILED DESCRIPTION

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein, but rather provided for the purpose of more thorough and complete understanding of the present disclosure. It should be understood that the drawings and embodiments of the present disclosure are only for illustration, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the term "including" and variations thereof are open-ended inclusions, i.e., "including but not limited to". The term "based on" means "at least partially based on." The term "one embodiment" means "at least one embodiment", the term "another embodiment" means "at least one another embodiment", and the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "one" and "plurality" mentioned in the present disclosure are illustrative rather than restrictive, and those skilled in the art should understand that they should be understood as "one or more" unless clearly indicated otherwise.

The names of messages or information exchanged between multiple devices in the embodiments of the present disclosure are provided only for illustration, and are not intended to limit the scope of these messages or information.

Figure 1:
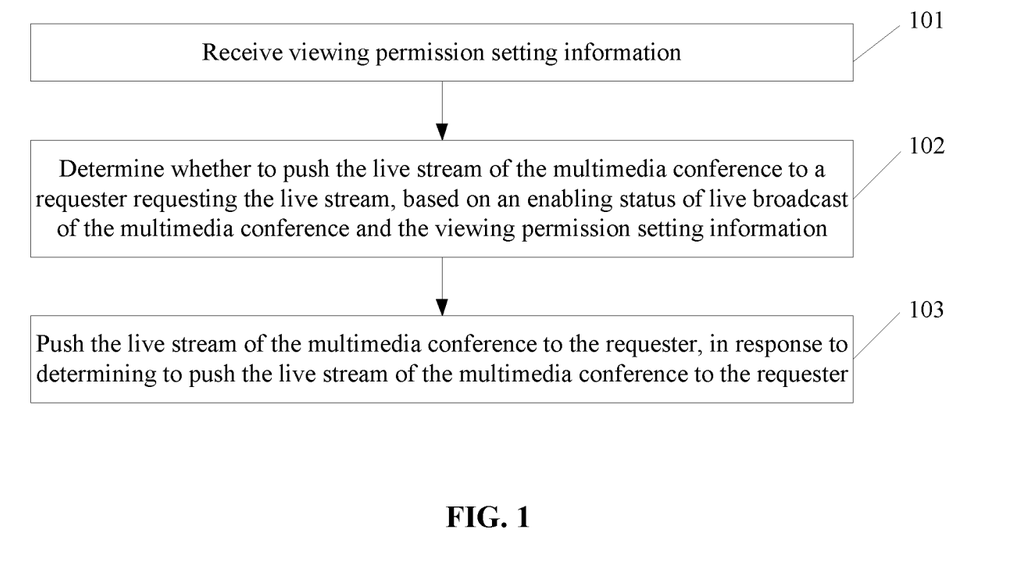
FIG. 1 is a flowchart of some embodiments of a live stream pushing method according to the present disclosure.

FIG. 1 shows the flow of some embodiments of the live stream pushing method according to the present disclosure. As shown in FIG. 1, the live stream pushing method includes the following steps 101 to 103.

In step 101, viewing permission setting information is received.

In this embodiment, the execution body (for example, the server 504 shown in FIG. 5) of the live stream pushing method may receive viewing permission setting information.

The above-mentioned multimedia conference may be a network conference that provides multiple functions such as audio and video.

The viewing permission setting information is used to represent the viewing permission for viewing the live stream of the multimedia conference. In other words, the viewing permission setting information may be information for setting viewing permission of the live stream of the multimedia conference.

In some scenarios, the viewing permission requires that the duration that a live viewer of the multimedia conference views a live stream is not less than a preset duration. The live viewer of the multimedia conference may be a viewer viewing the live stream of the multimedia conference.

In other scenarios, the viewing permission requires that the number of times that the live viewer exits viewing the live stream of the multimedia conference is not more than a preset number of times.

In some optional implementations of this embodiment, the viewing permission requires that an identity attribute of each live viewer of the multimedia conference meets a preset condition.

The identity attribute may be an attribute representing the identity of the user. For example, an identity attribute may be an attribute that represents the organization (e.g., institution, business, etc.) to which the user is authenticated.

The preset condition may be a condition preset for the identity attribute of the live viewer.

Therefore, when the identity attribute of the live viewer meets the preset condition, they can have the viewing permission of the live stream of the multimedia conference.

In some optional implementations of this embodiment, the preset condition includes: having the same identity attribute as a target participant user with a preset identity.

A participant user may be a user participating in a multimedia conference. Correspondingly, the target participant user may be a participant user with a preset identity.

The preset identity may be an identity that is set in advance. The target participant user can be distinguished from other conference participant users of the multimedia conference by the preset identity.

Therefore, the live viewer who has the same identity attribute as the target participant user may have the permission to view the live stream of the multimedia conference.

In step 102, it is determined whether to push the live stream of the multimedia conference to a requester requesting the live stream, based on an enabling status of live broadcast of the multimedia conference and the viewing permission setting information.

In this embodiment, after receiving the viewing permission setting information, the executive body may determine whether to push the live streaming of the multimedia conference to the requester requesting the live streaming based on the enabling status of live broadcast of the multimedia conference and the viewing permission setting information.

The enabling status of live broadcast may include a status that the live broadcast is enabled and a status that the live broadcast is not enabled.

In some scenarios, the viewing permission setting information indicates pushing, when the multimedia conference is in the status that the live broadcast is enabled, the live streaming of the multimedia conference to a requester having a first viewing permission, and pushing, when the multimedia conference is in the status that the live broadcast is not enabled, the live stream of the multimedia conference to a requester having a second viewing permission. Therefore, when the multimedia conference is in the status that the live broadcast is enabled, in response to that a requester has the first viewing permission, the executive body determines to push the live stream of the multimedia conference to the requester. When the multimedia conference is in the status that the live broadcast is not enabled, in response to that a requester has the second viewing permission, the executive body determines to push the live stream of the multimedia conference to the requester.

In some optional implementations of this embodiment, the execution subject may perform step 102 in the following manner.

Specifically, in the status that the live broadcast is not enabled, in response to receiving a live broadcast enabling request for the multimedia conference and determining that the requester has the viewing permission, it is determined to push the live stream of the multimedia conference to the requester.

It is understandable that the live broadcast enabling request for the multimedia conference is a request for enabling the live broadcast of the multimedia conference.

Therefore, when the multimedia conference is in the status that the live broadcast is not enabled, when receiving a request for enabling live broadcast of the multimedia conference is received and determining that the requester has the viewing permission for the live stream of the multimedia conference, it is determined to push the live stream of the multimedia conference to the requester.

In some optional implementations of this embodiment, before step 102, the execution subject may perform the following steps.

Specifically, in response to determining that the requester is not logged into the multimedia conference application, prompt information for logging into the multimedia conference application is sent to the requester, to prompt the requester to log into the multimedia conference application.

It is understandable that after receiving the prompt information for logging into the multimedia conference application sent by the execution body, the requester may log into the multimedia conference application. Thereby, on the basis that the requester logs into the multimedia conference application, the live stream of the multimedia conference is pushed to the requester.

In step 103, in response to determining to push the live stream of the multimedia conference to the requester, the execution body pushes the live stream of the multimedia conference to the requester.

In this embodiment, in response to determining to push the live stream of the multimedia conference to the requester, the execution body may push the live stream of the multimedia conference to the requester.

Figure 2:
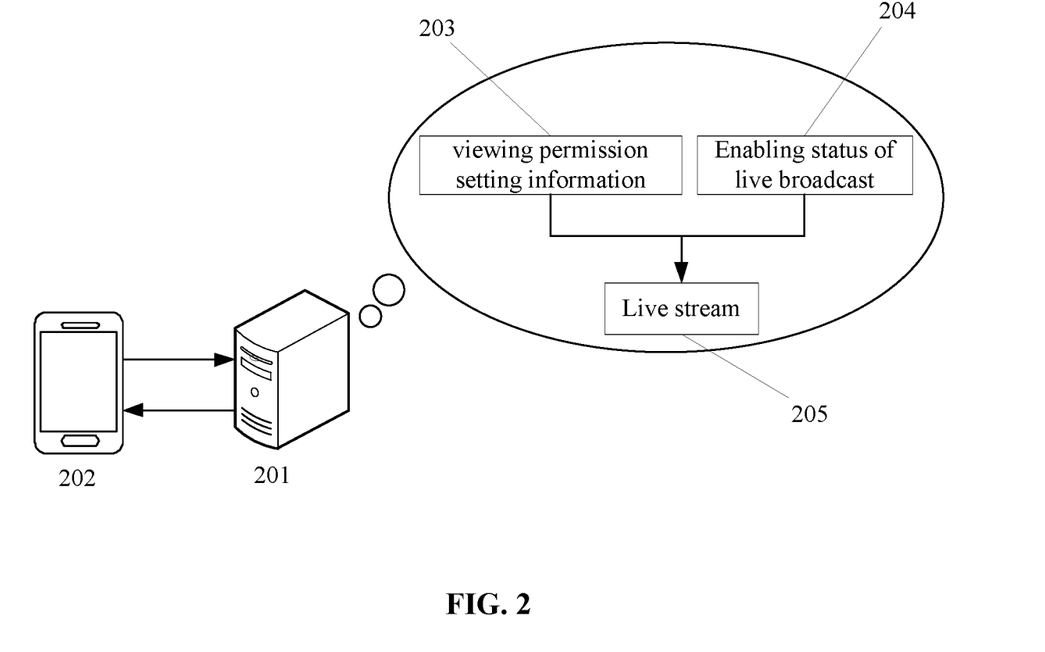
FIG. 2 is a schematic diagram of an application scenario of a live stream pushing method according to the present disclosure.

FIG. 2 shows an application scenario of the live stream pushing method according to an embodiment of the present disclosure. As shown in FIG. 2, first a server 201 may receive viewing permission setting information 203 sent by a terminal device 202. Then, the server 201 may determine whether to push a live stream 205 of a multimedia conference to the terminal device 202 based on the enabling status 204 of live broadcast of the multimedia conference and the viewing permission setting information 203. In response to determining to push the live stream 205 of the multimedia conference to the terminal device 202, the server 201 pushes the live stream 205 of the multimedia conference to the terminal device 202.

In the related art, the live stream of the multimedia conference is pushed to specified users, without the function of setting viewing permission for the multimedia conference, thereby resulting in a poor flexibility of pushing the live stream of the multimedia conference.

In this embodiment, after receiving the viewing permission setting information, it is determined whether to push the live stream of the multimedia conference to the requester, and if it is determined to push the live stream of the multimedia conference to the requester, the live stream of the multimedia conference is pushed to the requester. Therefore, by setting the viewing permission of the multimedia conference, the live stream of the multimedia conference is pushed to the requester having the viewing permission. Thus, the flexibility of pushing the live stream of the multimedia conference is improved. Based on the enabling status of live broadcast and viewing permission setting information of the multimedia conference, it is determined whether to push the live streaming of the multimedia conference to the requester requesting the live streaming. Therefore, whether to push the live streaming of the multimedia conference to the requester requesting the live streaming can be determined with reference to both the enabling status of live broadcast and the viewing permission setting information of the multimedia conference. Thus, the flexibility of pushing the live stream of the multimedia conference is further improved.

Figure 3:
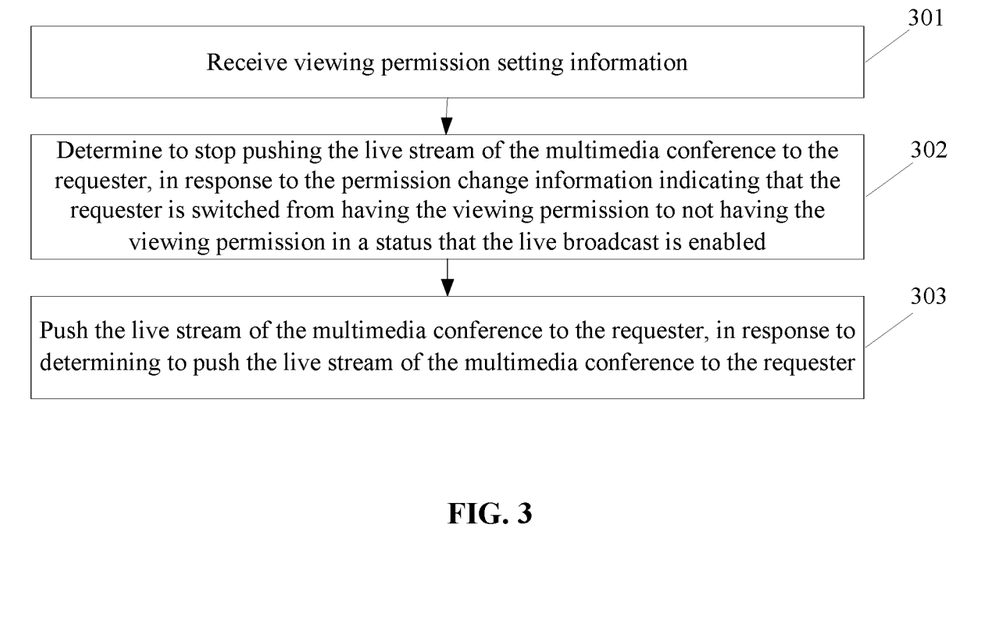
FIG. 3 is a flow chart of some other embodiments of a live stream pushing method according to the present disclosure.

FIG. 3 shows the flow of some other embodiments of the live stream pushing method according to the present disclosure. As shown in FIG. 3, the live stream pushing method includes the following steps 301 to 303.

In step 301, viewing permission setting information is received.

The step 301 can be performed in a similar manner to the step 101 in the embodiment shown in FIG. 1. The above description of the step 101 is also applicable to the step 301, and details are not repeated here.

In step 302, in response to the permission change information indicating that the requester is switched from is switched from having the viewing permission to not having the viewing permission in a status that the live broadcast is enabled, it is determined to stop pushing the live stream of the multimedia conference to the requester.

In this embodiment, the viewing permission setting information includes permission change information for representing a permission change.

In this embodiment, in a status that the live broadcast is enabled, the executive body determines the permission change mode of the requester indicated by the permission change information.

In this embodiment, in response to the permission change information indicating that the requester switches from having the viewing permission to not having the viewing permission, the executive body determines to stop pushing the live stream of the multimedia conference to the requester.

It is understandable that having the viewing permission refers to having the permission to viewing the live stream of the multimedia conference. Correspondingly, not having the viewing permission refers to not having the permission to viewing the live stream of the multimedia conference.

Step 303, in response to determining to push the live stream of the multimedia conference to the requester, the live stream of the multimedia conference is pushed to the requester.

The step 303 may be performed in a similar manner to the step 103 in the embodiment shown in FIG. 1. The above description for the step 103 is also applicable to the step 303, which will not be repeated here.

In this embodiment, when the multimedia conference is in a status that the live broadcast is enabled, if the requester is switched from is switched from having the viewing permission to not having the viewing permission, it is determined to stop pushing the live stream of the multimedia conference to the requester. Therefore, during the live broadcast of the live stream of the multimedia conference, the viewing permission for viewing the live stream of the multimedia conference can be changed.

In some optional implementations of the embodiments of the live stream pushing method of the present disclosure, the execution body may further perform the following steps.

In a first step, in response to receiving comment information for the live stream of the multimedia conference sent by a target live viewer, it is determined whether the target live viewer has logged into the multimedia conference application.

The target live viewer may be a live viewer who sends comment information for the live stream of the multimedia conference.

In some scenarios, when the live viewer logs into the multimedia conference application, the execution body may store the login information of the live viewer logging into the multimedia conference. Therefore, if the login information indicating that the target live viewer has logged into the multimedia conference is stored, the execution body can determine that the target live viewer has logged into the multimedia conference application. Otherwise, the executive body determines that the target live viewer has not logged into the multimedia conference application.

In a second step, in response to that the target live viewer has logged into the multimedia conference application, the comment information is sent to other live viewers of the multimedia conference.

Thus, when the target live viewer has logged into the multimedia conference application, the target live viewer can interact with other live viewers by sending comment information of the target live viewer to other live viewers.

In some optional implementations of the embodiments of the live stream pushing method of the present disclosure, the execution body may further perform the following steps.

In a first step, in response to that the target live viewer has not logged into the multimedia conference application, a prompt information for logging into the multimedia conference application is sent to the target live viewer.

In a second step, in response to receiving the login information indicating that the target live viewer has logged into the multimedia conference application, the comment information is sent to other live viewers.

Therefore, when the target live viewer has not logged into the multimedia conference application, the target live viewer is guided to log into the multimedia conference application by sending prompt information for logging into the multimedia conference application to the target live viewer. Further, the interaction between the target live viewer and other live viewers is realized.

In some optional implementations of the embodiments of the live stream pushing method of the present disclosure, the execution body (such as the server 504 shown in FIG. 5) of the live stream pushing method may perform the following steps.

In step S1, in response to receiving the conference exiting information indicating that a target participant user with a preset identity exits the multimedia conference, it is determined whether there exists a user having assignment permission for the preset identity.

The conference exiting information may be information indicating that the target participant user already exits or applied for exiting the multimedia conference.

The assignment permission for the preset identity may be the permission to be assigned with the preset identity. In other words, the assignment permission may be the permission to undertake the preset identity. It can be seen that the user having the assignment permission may be a user having the permission to undertake the preset identity.

In some scenarios, the executive body may determine whether there exists a user having the assignment permission for the preset identity among the participant users of the multimedia conference.

In step S2, in response to existence of the user having the assignment permission for the preset identity, the target user to be assigned with the preset identity is determined.

The target user may be the user to be assigned a preset identity is determined.

In practices, the execution subject may determine the target user to be assigned with the preset identity among the users having the assignment permission.

In step S3, the preset identity is assigned to the target user.

In some scenarios, after the target user is determined, the execution body assigns the preset identity to the target user.

In other scenarios, after the target user is determined, if the target user is not a member of the multimedia conference, the executive body may add the target user as a member of the multimedia conference, and assign the preset identity to the target user.

Therefore, when the target participant user having the preset identity exits unexpectedly or actively applies for exiting the multimedia conference, the target user who undertakes the preset identity is determined from the users having the permission to undertake the preset identity. Therefore, the preset identity of the target participant user is transferred to the target user, while ensuring the smooth progress of the multimedia conference.

As an example, the preset identity may be an identifier that indicates the user as the moderator of the multimedia conference. Correspondingly, the user having the assignment permission may be a user having the permission to play the role of the moderator. Thus, when the target participant user unexpectedly exits or applies for exiting the multimedia conference, the moderator identity of the target participant user is transferred to the target user who has the permission to undertake the moderator identity.

In some optional implementations of the embodiments of the live stream pushing method of the present disclosure, the execution body (such as the server 504 shown in FIG. 5) of the live stream pushing method may perform the following steps.

Specifically, in response to the absence of a user having the assignment permission, the push of the live stream of the multimedia conference to live viewers of a predetermined live platform is suspended.

It should be understood that the live platform may be a platform for live viewers to view the live stream of the multimedia conference. Correspondingly, the predetermined live broadcast platform may be one or more predetermined live broadcast platforms. Generally, a user with a preset identity plays an important role in the smooth progress of the multimedia conference. When there exists no participant user who undertakes the preset identity, the multimedia conference may not proceed smoothly, and further the viewing experience of the live stream of the multimedia conference may be poor.

Therefore, when there exists no user having the permission to undertake the preset identity, the push of the live stream of the multimedia conference to the live viewers of the live broadcast platform is suspended, so as not to push the live stream with poor viewing experience to the live viewers.

In some optional implementations of the embodiments of the live stream pushing method of the present disclosure, the conference exiting information includes designation information of a candidate user to be assigned the preset identity.

The designation information of the candidate user may be information designating the candidate user to be assigned with the preset identity.

In some scenarios, when the target participant user applies for exiting the multimedia conference, the target participant user may designate a candidate user to be assigned with the preset identity.

In this way, through the designation information included in the conference exiting information, the candidate user to be assigned with the preset identity can be actively designated. In some scenarios, the target participant user may designate the candidate user from the conference participant users of the multimedia conference. In some scenarios, the target participant user may designate the candidate user from his friends in the multimedia conferencing application.

In some optional implementations of the embodiments of the live stream pushing method of the present disclosure, the execution body (such as the server 504 shown in FIG. 5) of the live stream pushing method may determine whether there exists a user having the assignment permission for the preset identity in the following manner.

In a first step, in response to that a current viewing permission of the multimedia conference does not require that an identity attribute of each live viewer of the multimedia conference meets a preset condition, it is determined whether the candidate user has the assignment permission.

It is understandable that the current viewing permission is the viewing permission of the live stream of the multimedia conference at the time when the conference exiting information is received.

The current viewing permission not requiring that an identity attribute of each live viewer of the multimedia conference meets a preset condition, means that the live viewers whose identity attributes do not meet the preset condition are allowed to view the live stream of the multimedia conference. In this case, in some scenarios, the live viewer may be any viewer viewing the live stream of the multimedia conference through the live platform.

In some scenarios, the execution body may obtain the permission information of the candidate user from a local database server or a communicatively connected database server. Further, the execution body may determine whether the candidate user has the assignment permission for the preset identity according to the obtained permission information.

In a second step, in response to that a candidate user has the assignment permission, it is determined that there exists the user having the assignment permission.

Therefore, in a scenario where the identity attribute of live viewers is not restricted, when the target participant user actively applies to exit the multimedia conference, a target user who has the permission to undertake the preset identity is selected from the candidate users designated by the target participant user.

In some optional implementations of the embodiments of the live stream pushing method of the present disclosure, the execution body (such as the server 504 shown in FIG. 5) of the live stream pushing method may determine whether there exists a user having the assignment permission for the preset identity in the following manner.

In a first step, it is determined whether the identity attribute of the candidate user meets the preset condition in response to that the current viewing permission of the multimedia conference requires that an identity attribute of each live viewer of the multimedia conference meets a preset condition.

The current viewing permission requiring that an identity attribute of each live viewer of the multimedia conference meets a preset condition, means that any live viewer whose identity attribute does not meet the preset conditions cannot view the live stream of the multimedia conference.

In some scenarios, the execution body may obtain the identity attribute information of the candidate user from a local or communicatively connected database server. Further, the execution body may determine whether the identity attribute of the candidate user meets the preset condition according to the acquired identity attribute information.

In a second step, in response to that the identity attribute of the candidate user meets the preset condition, it is determined whether the candidate user has the assignment permission.

Optionally, the preset condition includes that the identity attribute of the candidate user is the same as the identity attribute of the target participant user. For example, the candidate user is in the same organization (such as institution, and enterprise) to which by the target participant user authenticated.

In a third step, in response to that the candidate user has the assignment permission, it is determined that there exists the user having the assignment permission.

Therefore, in the scenario where the identity attribute of the live viewer is restricted to meet the preset condition, when the target participant user actively applies for exiting the multimedia conference, the target user who has the permission to undertake the preset identity and has the identity attribute meeting the preset conditions is selected from the candidate users designated by the target participant user. In some optional implementations of the embodiments of the live stream pushing method of the present disclosure, the execution body (such as the server 504 shown in FIG. 5) of the live stream pushing method may determine the user to be assigned with the preset identity in the following manner.

Specifically, the candidate user is taken as the target user to be assigned with the preset identity.

Therefore, when the candidate user designated by the target participant user meets the requirements, the preset identity of the target participant user is transferred to the candidate user, thereby realizing that the target participant user actively transfers the preset identity to the candidate user designated by the target user.

In some optional implementations of the embodiments of the live stream pushing method of the present disclosure, the execution body (such as the server 504 shown in FIG. 5) of the live stream pushing method may perform the following steps.

Specifically, in response to that the identity attribute of the candidate user does not meet the preset condition, a prompt information indicating that the identity attribute of the candidate user does not meet the preset condition is sent to the target participant user.

Therefore, in the scenario of restricting the identity attribute of live viewers, if the identity attribute of the candidate user designated by the target participant user does not meet the preset condition, a prompt information is sent to the target participant user. Further, the target participant user can designate another candidate user. Therefore, by sending the prompt information, the target participant user is prompted to designate another candidate user whose identity attribute meets the preset condition.

In some optional implementations of the embodiments of the live stream pushing method of the present disclosure, the execution body (such as the server 504 shown in FIG. 5) of the live stream pushing method may perform the following steps.

Specifically, in response to that the candidate user does not have the assignment permission, prompt information indicating that the candidate user does not have the assignment permission is sent to the target participant user.

Therefore, when the candidate user designated by the target participant user does not have the permission to undertake the preset identity, a prompt information is sent to the target participant user. Further, the target participant user can designate another candidate user. Therefore, by sending the prompt information, the target participant user is prompted to designate another candidate user who has the permission to undertake the preset identity. In some optional implementations of the embodiments of the live stream pushing method of the present disclosure, the execution body (such as the server 504 shown in FIG. 5) of the live stream pushing method may determine whether there exists a user who has the assignment permission for the preset identity in the following manner.

In a first step, in response to the current viewing permission of the multimedia conference does not require that an identity attribute of each live viewer of the multimedia conference meets a preset condition, it is determined whether there exists at least one first user having the assignment permission among participant users of the multimedia conference.

The first user may be a user having the assignment permission, determined from the participant users.

In some scenarios, the execution body may obtain the permission information of the participant users from a local or communicatively connected database server. Further, the executive body may determine whether the participant users have the assignment permission for the preset identity according to the obtained permission information. Therefore, it is determined whether there exists at least one first user having the assignment permission for the preset identity among the participant users of the multimedia conference.

In a second step, in response to the existence of at least one first user, it is determined that there exists the user having the assignment permission.

At this time, the execution body may determine the target user to be assigned with the preset identity from the determined at least one first user. In some scenarios, the execution body may randomly determine one first user from the determined at least one first user as the target user to be assigned with the preset identity.

Therefore, in a scenario where the identity attributes of live viewers are not restricted, when the target user exits the multimedia conference unexpectedly, the target user who has the permission to undertake the preset identity is automatically selected from the participant users in the multimedia conference. Therefore, the system can automatically transfer the preset identity of the target participant user to the target user selected from the participant users.

In some optional implementations of the embodiments of the live stream pushing method of the present disclosure, the execution body (such as the server 504 shown in FIG. 5) of the live stream pushing method may, in the following manner, select the target user to be assigned with the preset identity from the determined at least one first users.

Specifically, in response to that the determined at least one first user includes a first user whose identity attribute meets the preset condition, the first user whose identity attribute meets the preset condition is determined as the target user from the at least one first user.

Therefore, when the determined at least one first user includes a first user whose identity attribute meets the preset condition, the first user whose identity attribute meets the preset condition is determined as the target user to be assigned the preset identity.

Therefore, in the scenario where the identity attributes of the live viewers is unrestricted to meet the preset condition, when the target participant user unexpectedly exits the multimedia conference, the users who has the permission to undertake the preset identity and has the identity attribute meeting the preset condition is preferentially selected as the target user, from the participant users of the multimedia conference.

In some optional implementations of the embodiments of the live stream pushing method of the present disclosure, the execution body (such as the server 504 shown in FIG. 5) of the live stream pushing method may determine whether there exists a user who has the assignment permission for the preset identity in the following manner.

In a first step, it is determined whether there exists at least one second user whose identity attribute meets the preset condition among the participant users of the multimedia conference, in response to that the current viewing permission of the multimedia conference requires that an identity attribute of each live viewer of the multimedia conference meets a preset condition.

The second user may be a user whose identity attribute meets a preset condition, determined from the participant users.

In some scenarios, the execution body may obtain the identity attribute information of the participant users from a local or a communicatively connected database server. Further, the execution body may determine whether the identity attributes of the participant users meet the preset condition according to the acquired identity attribute information. Therefore, it is determined whether there exists at least one first user having the assignment permission for the preset identity among the participant users of the multimedia conference.

In a second step, in response to the existence of at least one second user whose identity attribute meets the preset condition, it is determined whether there exists at least one second user having the assignment permission for the preset identity among the at least one second user.

In some scenarios, the execution body may obtain permission information of each second user from a local or a communicatively connected database server. Further, the execution body may determine whether each second user has the assignment permission for the preset identity according to the obtained permission information. Therefore, it can be determined whether there exists at least one second user having the assignment permission for the preset identity among the at least one second user.

In a third step, in response to that there exists a second user having the assignment permission for the preset identity among the at least one second user, it is determined that there exists the user having the assignment permission.

At this time, the execution body may determine, from the determined at least one second user, a second user having the assignment permission for the preset identity as the target user to be assigned with the preset identity.

In some scenarios, the execution body may randomly determine one second user from the determined at least one second user as the target user to be assigned with the preset identity.

Therefore, in the scenario of restricting the identity attributes of live viewers, the target user who has the permission to undertake the preset identity and has the identity attribute meeting the preset condition is automatically selected from the participant users of the multimedia conference.

Referring to the above content, in a scenario where the identity attributes of live viewers are not restricted, when selecting the target user to undertake the preset identity, it is unnecessary to verify the identity attributes of candidate users or participant users. In this case, the target user to be assigned with the preset identity can be selected under a low restriction. In the scenario of restricting the identity attributes of live viewers, when selecting the target user to undertake the preset identity, it is necessary to verify the identity attributes of the candidate users or participant users. In this case, the target user to be assigned with the preset identity can be selected under a high restriction.

Figure 4:
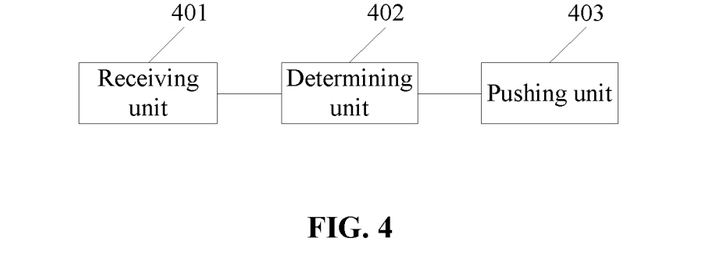
FIG. 4 is a schematic structural diagram of some embodiments of a live stream pushing apparatus according to the present disclosure.

Further referring to FIG. 4, as an implementation of the methods shown in the above figures, the present disclosure provides some embodiments of a live stream pushing apparatus. The apparatus embodiments correspond to the method embodiments shown in FIG. 1. The apparatus can be used in various electronic devices.

As shown in FIG. 4, the live stream pushing apparatus in this embodiment includes: a receiving unit 401, a determining unit 402, and a pushing unit 403. The receiving unit 401 is configured to receive viewing permission setting information. The viewing permission setting information represents a viewing permission for viewing a live stream of a multimedia conference. The determining unit 402 is configured to determine whether to push the live stream of the multimedia conference to a requester requesting the live stream, based on an enabling status of live broadcast of the multimedia conference and the viewing permission setting information. The pushing unit 403 is configured to push the live stream of the multimedia conference to the requester, in response to determining to push the live stream of the multimedia conference to the requester.

In this embodiment, for the specific processing and the technical effects of the receiving unit 401, the determining unit 402, and the pushing unit 403 of the live stream pushing apparatus, one may refer to steps 101, 102 and 103 in the corresponding embodiment shown in FIG. 1, which are not repeated here.

In some optional implementations, the viewing permission setting information comprises permission change information representing a permission change. The determining unit 402 is further configured to: determine to stop pushing the live stream of the multimedia conference to the requester, in response to the permission change information indicating that the requester is switched from having the viewing permission to not having the viewing permission in a status that the live broadcast is enabled.

In some optional implementations, the determining unit 402 is further configured to: determine to push the live stream of the multimedia conference to the requester, in response to receiving a live broadcast enabling request for the multimedia conference and determining that the requester has the viewing permission in a status that the live broadcast is not enabled.

In some optional implementations, the viewing permission requires that an identity attribute of each live viewer of the multimedia conference meets a preset condition.

In some optional implementations, the preset condition comprises: having the same identity attribute as a target participant user with a preset identity.

In some optional implementations, the live stream pushing apparatus may further include a first sending unit (not shown in the figure). The first sending unit is configured to send, in response to determining that the requester does not log into a multimedia conference application, a prompt information for logging into the multimedia conferencing application to the requester, to prompt the requester to log into the multimedia conferencing application.

In some optional implementations, the live stream pushing apparatus may further include a second sending unit (not shown in the figure). The second sending unit is configured to: determine, in response to receiving comment information for the live stream of the multimedia conference sent by a target live viewer, whether the target live viewer has logged into the multimedia conference application; and send, in response to that the target live viewer has logged into the multimedia conference application, the comment information to other live viewers of the multimedia conference.

In some optional implementations, the second sending unit is further configured to: send, in response to that the target live viewer has not logged into the multimedia conference application, prompt information for logging into the multimedia conference application to the target live viewer; and send, in response to receiving login information indicating that the target live viewer has logged into the multimedia conference application, the comment information to the other live viewers.

In some optional implementations, the live stream pushing apparatus may further include an assignment unit (not shown in the figure). The assignment unit is configured to determine whether there exists a user having assignment permission for a preset identity, in response to receiving conference exiting information indicating that a target participant user having the preset identity already exits the multimedia conference; determine a target user to be assigned with the preset identity, in response to existence of the user having the assignment permission; and assign the preset identity to the target user.

In some optional implementations, the assignment unit is further configured to: suspend pushing the live stream of the multimedia conference to live viewers of a predetermined live platform, in response to the absence of the user having the assignment permission.

In some optional implementations, the conference exiting information comprises designation information indicating a candidate user to be assigned with the preset identity.

In some optional implementations, the assignment unit is further configured to: determine whether the candidate user has the assignment permission, in response to that current viewing permission of the multimedia conference does not require an identity attribute of each live viewer of the multimedia conference meets a preset condition; and determine that there exists the user having the assignment permission, in response to that the candidate user has the assignment permission.

In some optional implementations, the assignment unit is further configured to: determine whether an identity attribute of a candidate user meets a preset condition, in response to that current viewing permission of the multimedia conference requires the identity attribute of each live viewer of the multimedia conference meets the preset condition; determine whether the candidate user has the assignment permission, in response to that the identity attribute of the candidate user meets the preset condition; and determine that there exists the user having the assignment permission, in response to that the candidate user has the assignment permission.

In some optional implementations, the assignment unit is further configured to: take the candidate user as the target user.

In some optional implementations, the assignment unit is further configured to: send prompt information indicating that the identity attribute of the candidate user does not meet the preset condition to the target participant user, in response to that the identity attribute of the candidate user does not meet the preset condition.

In some optional implementations, the assignment unit is further configured to: send prompt information indicating that the candidate user does not have the assignment permission to the target participant user, in response to that the candidate user does not have the assignment permission.

In some optional implementations, the assignment unit is further configured to: determine whether there exists at least one first user having the assignment permission among participant users of the multimedia conference, in response to that current viewing permission of the multimedia conference does not require that an identity attribute of each live viewer of the multimedia conference meets a preset condition; and determine that there exists the user having the assignment permission, in response to existence of the at least one first user. The assignment unit is further configured to: determine the target user from the at least one first user.

In some optional implementations, the assignment unit is further configured to: determine, from the at least one first user, a first user having the identity attribute meeting the preset condition as the target user, in response to existence of the first user having the identity attribute meeting the preset condition among the at least one first user.

In some optional implementations, the assignment unit is further configured to: determine whether there exists at least one second user having an identity attribute meeting a preset condition among participant users of the multimedia conference, in response to that current viewing permission of the multimedia conference requires that the identity attribute of each live viewer of the multimedia conference meets the preset condition; determine whether there exists a second user having the assignment permission among the at least one second user, in response to existence of the at least one second user; and determine that there exists the user having the assignment permission, in response to existence of the second user having the assignment permission among the at least one second user. The assignment unit is further configured to determine the second user having the assignment permission among the at least one second user as the target user.

Figure 5:
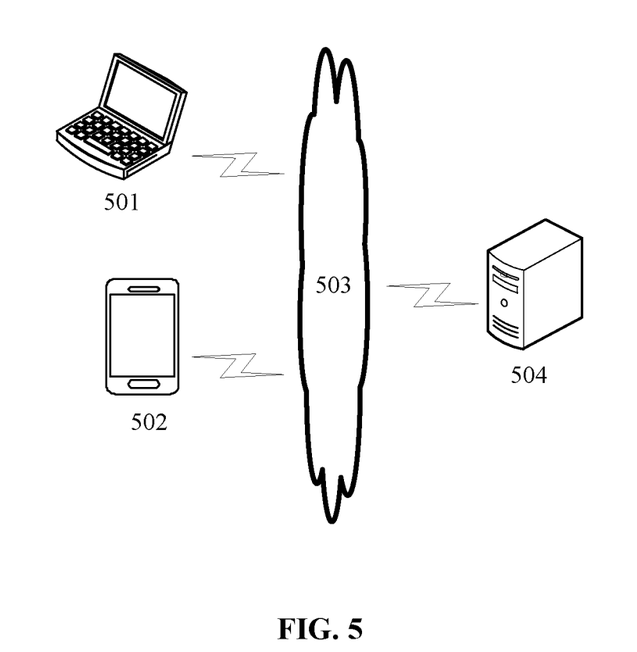
FIG. 5 is an exemplary system architecture for applying the live stream pushing method according to some embodiments of the present disclosure.

With further reference to FIG. 5, FIG. 5 illustrates an exemplary system architecture for applying the live stream pushing method of some embodiments of the present disclosure.

As shown in FIG. 5, the system architecture may include terminal devices 501 and 502, a network 503, and a server 504. The network 503 is a medium used to provide communication links between the terminal devices 501, 502 and the server 504. The network 503 may include various connection types, such as wired, wireless communication links, or fiber optic cables.

The terminal devices 501 and 502 can interact with the server 504 through the network 503. Various client applications may be installed on the terminal devices 501 and 502. For example, a multimedia conference application, a live broadcast application or the like may be installed on the terminal devices 501 and 502. In some scenarios, the terminal devices 501 and 502 may send viewing permission setting information to the server 504. In other scenarios, the terminal devices 501 and 502 may send a request for viewing a live stream to the server 504.

The terminal devices 501 and 502 may be implemented in hardware or software. When the terminal devices 501 and 502 are implemented in hardware, they can be various electronic devices having a display screen and supporting information interaction, including but not limited to smart phones, tablet computers, laptop computers, desktop computers, and the like. When the terminal devices 501 and 502 are implemented in software, they can be installed in the electronic devices listed above. It may be implemented as multiple software or software modules, or may be implemented as a single software or software module, which is not limited here.

The server 504 may be a server that provides various services. In some scenarios, the server 504 may determine whether to push the live stream of the multimedia conference to the terminal devices 501 and 502 based on the viewing permission setting information and the enabling status of live broadcast of the multimedia conference. In response to determining to push the live stream of the multimedia conference to the terminal devices 501 and 502, the server 504 pushes the live stream of the multimedia conference to the terminal devices 501 and 502.

The server 504 may be implemented in hardware or software. When the server 504 is implemented in hardware, it may be implemented as a distributed server cluster composed of multiple servers, or may be implemented as a single server. When the server 504 is implemented in software, it may be implemented as multiple software or software modules (e.g., multiple software or software modules for providing distributed services), or may be implemented as a single software or software module, which is not limited here.

It should be noted that the live stream pushing method provided by the embodiments of the present disclosure may be executed by the server 504, and correspondingly the live stream pushing apparatus may be provided in the server 504.

It should be understood that the numbers of terminal devices, networks and servers in FIG. 5 are only illustrative. There can be any number of terminal devices, networks and servers according to implementation requirements.

Figure 6:
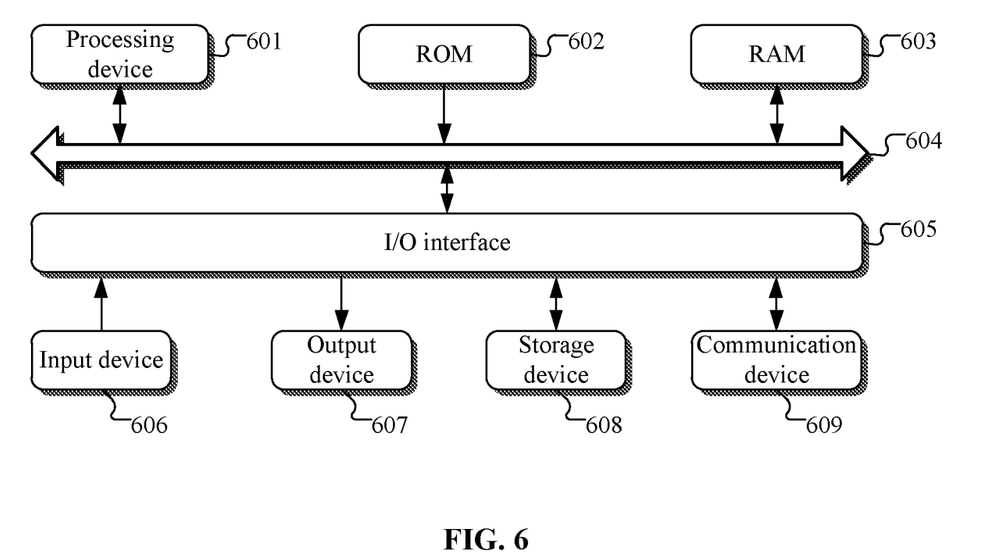
FIG. 6 is a schematic diagram of a basic structure of an electronic device provided according to some embodiments of the present disclosure.

FIG. 6 shows a schematic structural diagram of an electronic device (such as the server in FIG. 5) suitable for implementing some embodiments of the present disclosure. The electronic device shown in FIG. 6 is only an example, and should not impose any limitation on the function and scope of use of the embodiments of the present disclosure.

As shown in FIG. 6, the electronic device may include a processing device (such as a central processing unit, a graphic processor) 601 that executes various appropriate operations and processes according to a program stored in a read only memory (ROM) 602 or loaded into a random access memory (RAM) 603 from a storage device 608. In the RAM 603, various programs and data necessary for the operation of the electronic device are also stored. The processing device 601, the ROM 602, and the RAM 603 are connected to each other through a bus 604. An input/output (I/O) interface 605 is also connected to bus 604.

Typically, the following devices may be connected to the I/O interface 605: an input device 606 such as a touch screen, a touchpad, a keyboard, a mouse, a camera, a microphone, an accelerometer, or a gyroscope; an output device 607 such as a liquid crystal display (LCD), a speaker, or a vibration; a storage device 608 such as a magnetic tape, or a hard disk; and a communication device 609. The communication device 609 may allow the electronic device to communicate with other devices to exchange data in a wired or wirelessly manner. Although FIG. 6 illustrates an electronic device having various devices, it should be understood that not all of the illustrated devices are required to be implemented or provided. More or fewer devices may alternatively be implemented or provided. Each block shown in FIG. 6 may represent one device, or may represent multiple devices as required.

In particular, according to some embodiments of the present disclosure, the processes described above with reference to the flowcharts may be implemented as computer software programs. For example, some embodiments of the present disclosure include a computer program product comprising a computer program carried on a non-transitory computer readable medium, the computer program containing program code for performing the method illustrated in the flowchart. In such an embodiment, the computer program may be downloaded and installed from the network via the communication device 609, or from the storage device 608, or from the ROM 602. When the computer program is executed by the processing apparatus 601, the above-mentioned functions defined in the methods of the embodiments of the present disclosure are executed.

It should be noted that the computer-readable medium described in some embodiments of the present disclosure may be a computer-readable signal medium or a computer-readable storage medium, or any combination thereof. The computer-readable storage medium can be, for example but not limited to, an electrical, magnetic, optical, electromagnetic, infrared, or semiconductor system, apparatus or device, or any combination thereof. More specific examples of computer readable storage media may include, but are not limited to, electrical connections with one or more wires, portable computer disks, a hard disk, a random access memory (RAM), a read only memory (ROM), an erasable Programmable read only memory (EPROM or flash memory), a optical fiber, a portable compact disk read only memory (CD-ROM), an optical storage device, a magnetic storage device, or any suitable combination thereof. In some embodiments of the present disclosure, a computer-readable storage medium can be any tangible medium that contains or stores a program that can be used by or in conjunction with an instruction execution system, apparatus, or device. In some embodiments of the present disclosure, the computer-readable signal medium may include a data signal propagated in baseband or as part of a carrier wave, carrying computer-readable program code therein. Such propagated data signals may take a variety of forms, including but not limited to electromagnetic signals, optical signals, or any suitable combination thereof. The computer-readable signal medium can also be any computer-readable medium other than a computer-readable storage medium that can transmit, propagate, or transport the program for use by or in connection with the instruction execution system, apparatus, or device. Program code embodied on a computer readable medium may be transmitted using any suitable medium including, but not limited to, an electrical wire, an optical fiber cable, a RF (radio frequency), or any suitable combination thereof.

In some embodiments, the client and server can use any currently known or future developed network protocol such as HTTP (HyperText Transfer Protocol) to perform communications, and can be connected to any digital communications (such as a communication network) in any form or medium. Examples of communication networks include a local area network (LAN), a wide area networks (WAN), an internet (such as the Internet), and a peer-to-peer network (such as an ad hoc peer-to-peer network), as well as any currently known or future developed network.

The computer-readable medium may be included in the electronic device, or may exist independently without being assembled into the electronic device. The computer-readable medium carries one or more programs. When the one or more programs are executed by the electronic device, the electronic device is controlled to: receive viewing permission setting information, wherein the viewing permission setting information represents a viewing permission for viewing a live stream of a multimedia conference; determine whether to push the live stream of the multimedia conference to a requester requesting the live stream, based on an enabling status of live broadcast of the multimedia conference and the viewing permission setting information; and push the live stream of the multimedia conference to the requester, in response to determining to push the live stream of the multimedia conference to the requester.

Computer program code for carrying out operations of some embodiments of the present disclosure may be written in one or more programming languages, including but not limited to object-oriented programming languages, such as Java, Smalltalk, or a combination thereof. C++, and conventional procedural programming languages, such as the C language or similar programming languages. The program code may be executed entirely on the user's computer, partly on the user's computer, as a stand-alone software package, partly on the user's computer and partly on a remote computer, or entirely on a remote computer or server. In the case of a remote computer, the remote computer may be connected to the user's computer through any kind of network, including a local area network (LAN) or a wide area network (WAN), or may be connected to an external computer (for example, using an Internet connection provided by an Internet service provider).

The flowchart and block diagrams in the figures illustrate the architecture, functions, and operations of possible implementations of systems, methods and computer program products according to various embodiments of the present disclosure. In this regard, each block in the flowchart or block diagram may represent a module, segment, or portion of code that contains one or more executable instructions for implementing the logical functions. It should also be noted that, in some alternative implementations, the functions noted in the blocks may occur in a different order from that in the figures. For example, two blocks shown in succession may, in fact, be executed substantially concurrently, or the blocks may sometimes be executed in the reverse order, depending upon the functionality involved. It is also noted that each block of the block diagrams and/or flowcharts, and combinations of blocks in the block diagrams and/or flowcharts, can be implemented in a dedicated hardware-based system used for performing specified functions or operations, or can be implemented in a combination of dedicated hardware and computer instructions.

The units described in some embodiments of the present disclosure may be implemented by means of software or hardware. The names of these units do not constitute a limitation on the unit in some cases, for example, the receiving unit may also be described as a unit for "receiving viewing permission setting information".

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs).

In the context of the present disclosure, a machine-readable medium may be a tangible medium that may contain or store a program for use by or in connection with a instruction execution system, apparatus or device. The machine-readable medium may be a machine-readable signal medium or a machine-readable storage medium. The machine-readable media may include, but are not limited to, electronic, magnetic, optical, electromagnetic, infrared, or semiconductor systems, devices, or devices, or any suitable combination thereof. More specific examples of the machine-readable storage media include electrical connections using one or more wires, a portable computer disk, a hard disk, a random access memory (RAM), a read only memory (ROM), an erasable programmable read only memory (EPROM or flash memory), an optical fiber, a compact disk read only memory (CD-ROM), an optical storage device, a magnetic storage device, or any suitable combination thereof.

The above descriptions are merely some preferred embodiments of the present disclosure and illustrations of the applied technical principles. Those skilled in the art should understand that the scope of disclosure involved in the embodiments of the present disclosure is not limited to the technical solutions formed by the specific combination of the above-mentioned technical features, and should also cover, without departing from the disclosed concept, other technical solutions formed by any combination of the technical features or their equivalent features, such as a technical solution formed by replacing the above features with the technical features with similar functions disclosed in the present disclosure (but not limited to).

The invention claimed is:

1. A live stream pushing method, comprising:
   receiving viewing permission setting information, wherein the viewing permission setting information represents a viewing permission for viewing a live stream of a multimedia conference;
   determining whether to push the live stream of the multimedia conference to a requester requesting the live stream, based on an enabling status of live broadcast of the multimedia conference and the viewing permission setting information;
   pushing the live stream of the multimedia conference to the requester, in response to determining to push the live stream of the multimedia conference to the requester;
   wherein the method further comprises:
   determining whether there exists a user having assignment permission for a preset identity, in response to receiving conference exiting information indicating that a target participant user having the preset identity exits the multimedia conference; and
   suspending pushing the live stream of the multimedia conference to live viewers of a predetermined live platform, in response to absence of the user having the assignment permission.

2. The method according to claim 1, wherein the viewing permission setting information comprises permission change information representing a permission change; and
   the determining whether to push the live stream of the multimedia conference to a requester requesting the live stream, based on an enabling status of live broadcast of the multimedia conference and the viewing permission setting information comprises:
   determining to stop pushing the live stream of the multimedia conference to the requester, in response to the permission change information indicating that the requester is switched from having the viewing permission to not having the viewing permission in a status that the live broadcast is enabled.

3. The method according to claim 1, wherein the determining whether to push the live stream of the multimedia conference to a requester requesting the live stream, based on an enabling status of live broadcast of the multimedia conference and the viewing permission setting information comprises:
   determining to push the live stream of the multimedia conference to the requester, in response to receiving a live broadcast enabling request for the multimedia conference and determining that the requester has the viewing permission in a status that the live broadcast is not enabled.

4. The method according to claim 1, wherein the viewing permission requires that an identity attribute of each live viewer of the multimedia conference meets a preset condition.

5. The method according to claim 4, wherein the preset condition comprises: having the same identity attribute as a target participant user with a preset identity.

6. The method according to claim 4, wherein before the determining whether to push the live stream of the multimedia conference to a requester requesting the live stream, the method further comprises:
   sending, in response to determining that the requester does not log into a multimedia conference application, a prompt information for logging into the multimedia conferencing application to the requester, to prompt the requester to log into the multimedia conferencing application.

7. The method according to claim 1, further comprising:
   determining, in response to receiving comment information for the live stream of the multimedia conference sent by a target live viewer, whether the target live viewer has logged into the multimedia conference application; and
   sending, in response to that the target live viewer has logged into the multimedia conference application, the comment information to other live viewers of the multimedia conference.

8. The method according to claim 7, further comprising:
   sending, in response to that the target live viewer has not logged into the multimedia conference application, prompt information for logging into the multimedia conference application to the target live viewer; and
   sending, in response to receiving login information indicating that the target live viewer has logged into the multimedia conference application, the comment information to the other live viewers.

9. The method according to claim 1, further comprising:
   determining a target user to be assigned with the preset identity, in response to existence of the user having the assignment permission; and
   assigning the preset identity to the target user.

10. The method according to claim 1, wherein the conference exiting information comprises designation information indicating a candidate user to be assigned with the preset identity.

11. The method according to claim 10, wherein the determining whether there exists a user having assignment permission for a preset identity comprises:
    determining whether the candidate user has the assignment permission, in response to that current viewing permission of the multimedia conference does not require an identity attribute of each live viewer of the multimedia conference meets a preset condition; and
    determining that there exists the user having the assignment permission, in response to that the candidate user has the assignment permission.

12. The method according to claim 10, wherein the determining whether there exists a user having assignment permission for a preset identity comprises:
    determining whether an identity attribute of a candidate user meets a preset condition, in response to that current viewing permission of the multimedia conference requires the identity attribute of each live viewer of the multimedia conference meets the preset condition;

determining whether the candidate user has the assignment permission, in response to that the identity attribute of the candidate user meets the preset condition; and determining that there exists the user having the assignment permission, in response to that the candidate user has the assignment permission.

13. The method according to claim 11, wherein the determining the target user to be assigned with the preset identity comprises:

taking the candidate user as the target user.

14. The method according to claim 12, further comprising:

sending prompt information indicating that the identity attribute of the candidate user does not meet the preset condition to the target participant user, in response to that the identity attribute of the candidate user does not meet the preset condition.

15. The method according to claim 11, further comprising:

sending prompt information indicating that the candidate user does not have the assignment permission to the target participant user, in response to that the candidate user does not have the assignment permission.

16. The method according to claim 9, wherein the determining whether there exists a user having assignment permission for the preset identity comprises:

determining whether there exists at least one first user having the assignment permission among participant users of the multimedia conference, in response to that current viewing permission of the multimedia conference does not require that an identity attribute of each live viewer of the multimedia conference meets a preset condition; and determining that there exists the user having the assignment permission, in response to existence of the at least one first user; and wherein the determining the target user to be assigned with the preset identity comprises:

determining the target user from the at least one first user.

17. The method according to claim 16, wherein the determining the target user from the at least one first user comprises:

determining, from the at least one first user, a first user having the identity attribute meeting the preset condition as the target user, in response to existence of the first user having the identity attribute meeting the preset condition among the at least one first user.

18. The method according to claim 9, wherein the determining whether there exists a user having assignment permission for the preset identity comprises:

determining whether there exists at least one second user having an identity attribute meeting a preset condition among participant users of the multimedia conference, in response to that current viewing permission of the multimedia conference requires that the identity attribute of each live viewer of the multimedia conference meets the preset condition;

determining whether there exists a second user having the assignment permission among the at least one second user, in response to existence of the at least one second user; and determining that there exists the user having the assignment permission, in response to existence of the second user having the assignment permission among the at least one second user; and wherein the determining the target user to be assigned with the preset identity comprises:

determining the second user having the assignment permission among the at least one second user as the target user.

19. A live stream pushing apparatus, comprising:

one or more processors; and storage means for storing one or more programs, wherein the one or more programs, when executed by the one or more processors, cause the one or more processors to perform operations comprising:

receiving viewing permission setting information, wherein the viewing permission setting information represents a viewing permission for viewing a live stream of a multimedia conference;

determining whether to push the live stream of the multimedia conference to a requester requesting the live stream, based on an enabling status of live broadcast of the multimedia conference and the viewing permission setting information;

pushing the live stream of the multimedia conference to the requester, in response to determining to push the live stream of the multimedia conference to the requester;

wherein the operations further comprise:

determining whether there exists a user having assignment permission for a preset identity, in response to receiving conference exiting information indicating that a target participant user having the preset identity exits the multimedia conference; and suspending pushing the live stream of the multimedia conference to live viewers of a predetermined live platform, in response to absence of the user having the assignment permission.

20. A non-transitory computer-readable medium storing a computer program, wherein the program, when being executed by a processor, causes the processor to perform operations comprising:

receiving viewing permission setting information, wherein the viewing permission setting information represents a viewing permission for viewing a live stream of a multimedia conference;

determining whether to push the live stream of the multimedia conference to a requester requesting the live stream, based on an enabling status of live broadcast of the multimedia conference and the viewing permission setting information;

pushing the live stream of the multimedia conference to the requester, in response to determining to push the live stream of the multimedia conference to the requester;

wherein the operations further comprise:

determining whether there exists a user having assignment permission for a preset identity, in response to receiving conference exiting information indicating that a target participant user having the preset identity exits the multimedia conference; and suspending pushing the live stream of the multimedia conference to live viewers of a predetermined live platform, in response to absence of the user having the assignment permission.

* * * * *